US011294907B2

(12) United States Patent
Sen et al.

(10) Patent No.: US 11,294,907 B2
(45) Date of Patent: Apr. 5, 2022

(54) DOMAIN QUERY EXECUTION USING USER-PROVIDED DEFINITION

(71) Applicant: International Business Machines Corporation, Armonk, NY (US)

(72) Inventors: Jaydeep Sen, Bangalore (IN); Ashish Mittal, Bangalore (IN); Diptikalyan Saha, Bangalore (IN); Karthik Sankaranarayanan, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 37 days.

(21) Appl. No.: 16/810,610

(22) Filed: Mar. 5, 2020

(65) Prior Publication Data
US 2021/0279243 A1    Sep. 9, 2021

(51) Int. Cl.
*G06F 16/2457*    (2019.01)
*G06F 16/36*    (2019.01)

(52) U.S. Cl.
CPC ...... *G06F 16/24573* (2019.01); *G06F 16/367* (2019.01)

(58) Field of Classification Search
CPC .............. G06F 16/24573; G06F 16/367
USPC ..................................................... 707/766
See application file for complete search history.

(56) References Cited

U.S. PATENT DOCUMENTS

| 8,190,631 | B2* | 5/2012 | Ah-Soon | G06F 16/24573 |
| | | | | 707/769 |
| 8,346,795 | B2* | 1/2013 | Roulland | G06F 16/3325 |
| | | | | 707/766 |
| 8,694,530 | B2* | 4/2014 | Musgrove | G06F 16/2423 |
| | | | | 707/767 |
| 8,903,842 | B2* | 12/2014 | Bloesch | G06F 16/24573 |
| | | | | 707/766 |

(Continued)

OTHER PUBLICATIONS

Anselmo Penas et al., "Continuous Learning for Question Answering", IWSDS 2019, International Workshop on Spoken Dialogue Systems Technology—Call for Workshops and Special Sessions, Apr. 24-26, 2019, Siracusa, Italy, 4 pages, Copy available at: https://ixa.eus/sites/default/files/dokumentuak/12780/2019_IWSDS.pdf.

(Continued)

*Primary Examiner* — Ashish Thomas
*Assistant Examiner* — Nargis Sultana
(74) *Attorney, Agent, or Firm* — Ference & Associates LLC

(57) ABSTRACT

One embodiment provides a method, including: receiving a query from a user; identifying that a desired definition of the at least one term is unknown, by determining that the at least one term does not map to a term having a known definition; receiving the definition of the at least one term from the user; adding the definition to a domain grammar comprising (i) domain-specific terminology and (ii) definitions corresponding to the terms within the domain grammar, wherein the adding comprises (a) extracting expressions from the (Continued)

requested definition and (b) adding, for the at least one term, the expressions into a structured format within the domain grammar; combining (iii) the requested definition and (iv) terms from the parsed query having previously known definitions into a complete query; and providing a response to the query by executing the complete query on a knowledge store.

20 Claims, 3 Drawing Sheets

(56) References Cited

U.S. PATENT DOCUMENTS

| | | | |
|---|---|---|---|
| 9,460,085 B2* | 10/2016 | Barbetta | G06F 16/3326 |
| 10,176,800 B2* | 1/2019 | Chen | G10L 15/063 |
| 2003/0055819 A1* | 3/2003 | Saito | G06F 16/3322 |
| 2008/0104047 A1* | 5/2008 | Nagarajayya | G06F 40/30 |
| 2016/0217389 A1* | 7/2016 | Cordes | G06N 5/04 |

OTHER PUBLICATIONS

Mathilde Veron et al., "Lifelong learning and task-oriented dialogue system: what does it mean?", IWSDS 2019, International Workshop on Spoken Dialogue Systems Technology—Call for Workshops and Special Sessions, Apr. 24-26, 2019, Siracusa, Italy, 12 pages, HAL.

Jiwei Li et al., "Learning Through Dialogue Interactions by Asking Questions", ICLR 2017, 16 pages, arXiv:1612.04936v4 [cs.CL] Feb. 13, 2017.

Jiwei Li et al., "Dialogue Learning with Human-in-the-Loop", ICLR 2017, 23 pages, arXiv:1611.09823v3 [cs.AI] Jan. 13, 2017.

Ben Hixon et al., "Learning Knowledge Graphs for Question Answering through Conversational Dialog", Human Language Technologies: The 2015 Annual Conference of the North American Chapter of the ACL, May 31-Jun. 5, 2015, Denver, CO, USA, 11 pages, Association for Computational Linguistics.

Jason Weston, "Dialog-based Language Learning", Oct. 24, 2016, 10 pages, arXiv:1604.06045v7 [cs.CL] Oct. 24, 2016.

Xiaoxiao Guo et al., "Learning to Query, Reason, and Answer Questions on Ambiguous Texts", ICLR 2017, International Conference on Learning Representations, Apr. 24-26, 2017, Toulon, France, 12 pages.

* cited by examiner

DOMAIN QUERY EXECUTION USING USER-PROVIDED DEFINITION

BACKGROUND

Information, particularly digital information, is stored in many different data repositories or knowledge stores. In the case that a user has created the data repository and stored information, the information may be organized in a manner so that the creating user is able to remember the information location and, therefore, recall the information. For example, a user may create folders within a hierarchical folder structure and name the folders in a manner that allows the user to understand and know what information is stored in each folder. However, since the amount of digital information may continually increase, the organization of the folders may become more complicated and lead to a user, even the creating user, forgetting where information is stored. Additionally, a creating user may know that information exists, but may not know enough information about the information in order to recall where the information is stored. Thus, finding information can be very time-consuming and becomes very complicated.

In addition to this, many data repositories contain information that is organized by a system, which makes it very difficult for a user to manually find information because the information is organized and stored in a manner that allows the system to find the information and is not necessarily intuitive to an individual. Thus, many systems allow a user to query the system in order to obtain information from a knowledge store. The user is able to provide a query, many times in a natural language format, to the system and the system converts the query into a machine-readable format and uses the converted query to execute the query on the data repository. The system can then provide a responsive output to the user. This prevents the user from having to manually find information.

BRIEF SUMMARY

In summary, one aspect of the invention provides a method, comprising: receiving a query from a user, wherein the query comprises at least one term related to a particular domain; identifying that a desired definition of the at least one term is unknown, by determining that the at least one term does not map to a term having a known definition; receiving, responsive to requesting feedback from a user, a requested definition of the at least one term from the user; adding, for the at least one term, the requested definition to a domain grammar comprising (i) domain-specific terminology and (ii) various definitions corresponding to the terms within the domain grammar, wherein the adding comprises (a) extracting expressions from the requested definition and (b) adding, for the at least one term, the expressions into a structured format within the domain grammar; combining (iii) the requested definition and (iv) terms from the parsed query having previously known definitions into a complete query; and providing a response to the query by executing the complete query on a knowledge store.

Another aspect of the invention provides an apparatus, comprising: at least one processor; and a computer readable storage medium having computer readable program code embodied therewith and executable by the at least one processor, the computer readable program code comprising: computer readable program code configured to receive a query from a user, wherein the query comprises at least one term related to a particular domain; computer readable program code configured to identify that a desired definition of the at least one term is unknown, by determining that the at least one term does not map to a term having a known definition; computer readable program code configured to receive, responsive to requesting feedback from a user, a requested definition of the at least one term from the user; computer readable program code configured to add, for the at least one term, the requested definition to a domain grammar comprising (i) domain-specific terminology and (ii) various definitions corresponding to the terms within the domain grammar, wherein the adding comprises (a) extracting expressions from the requested definition and (b) adding, for the at least one term, the expressions into a structured format within the domain grammar; computer readable program code configured to combine (iii) the requested definition and (iv) terms from the parsed query having previously known definitions into a complete query; and computer readable program code configured to provide a response to the query by executing the complete query on a knowledge store.

An additional aspect of the invention provides a computer program product, comprising: a computer readable storage medium having computer readable program code embodied therewith, the computer readable program code executable by a processor and comprising: computer readable program code configured to receive a query from a user, wherein the query comprises at least one term related to a particular domain; computer readable program code configured to identify that a desired definition of the at least one term is unknown, by determining that the at least one term does not map to a term having a known definition; computer readable program code configured to receive, responsive to requesting feedback from a user, a requested definition of the at least one term from the user; computer readable program code configured to add, for the at least one term, the requested definition to a domain grammar comprising (i) domain-specific terminology and (ii) various definitions corresponding to the terms within the domain grammar, wherein the adding comprises (a) extracting expressions from the requested definition and (b) adding, for the at least one term, the expressions into a structured format within the domain grammar; computer readable program code configured to combine (iii) the requested definition and (iv) terms from the parsed query having previously known definitions into a complete query; and computer readable program code configured to provide a response to the query by executing the complete query on a knowledge store.

A further aspect of the invention provides a method, comprising: receiving a query from a user; identifying known terms within the query having known definitions; identifying an unknown term within the query having an unknown definition and being related to a particular subject-matter area, wherein the identifying comprises comparing the unknown term to a subject-matter area grammar and determining the unknown term is not included in the subject-matter area grammar; requesting, from a user, a definition for the unknown term; for the unknown term and upon receipt of the definition from the user, parsing the definition and adding the parsed definition to the subject-matter area grammar for the unknown term; creating a complete query from (i) the definition of the unknown term and (ii) the known definitions of the terms; and providing a response to the query by utilizing the complete query to perform a search for the response on a knowledge store.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
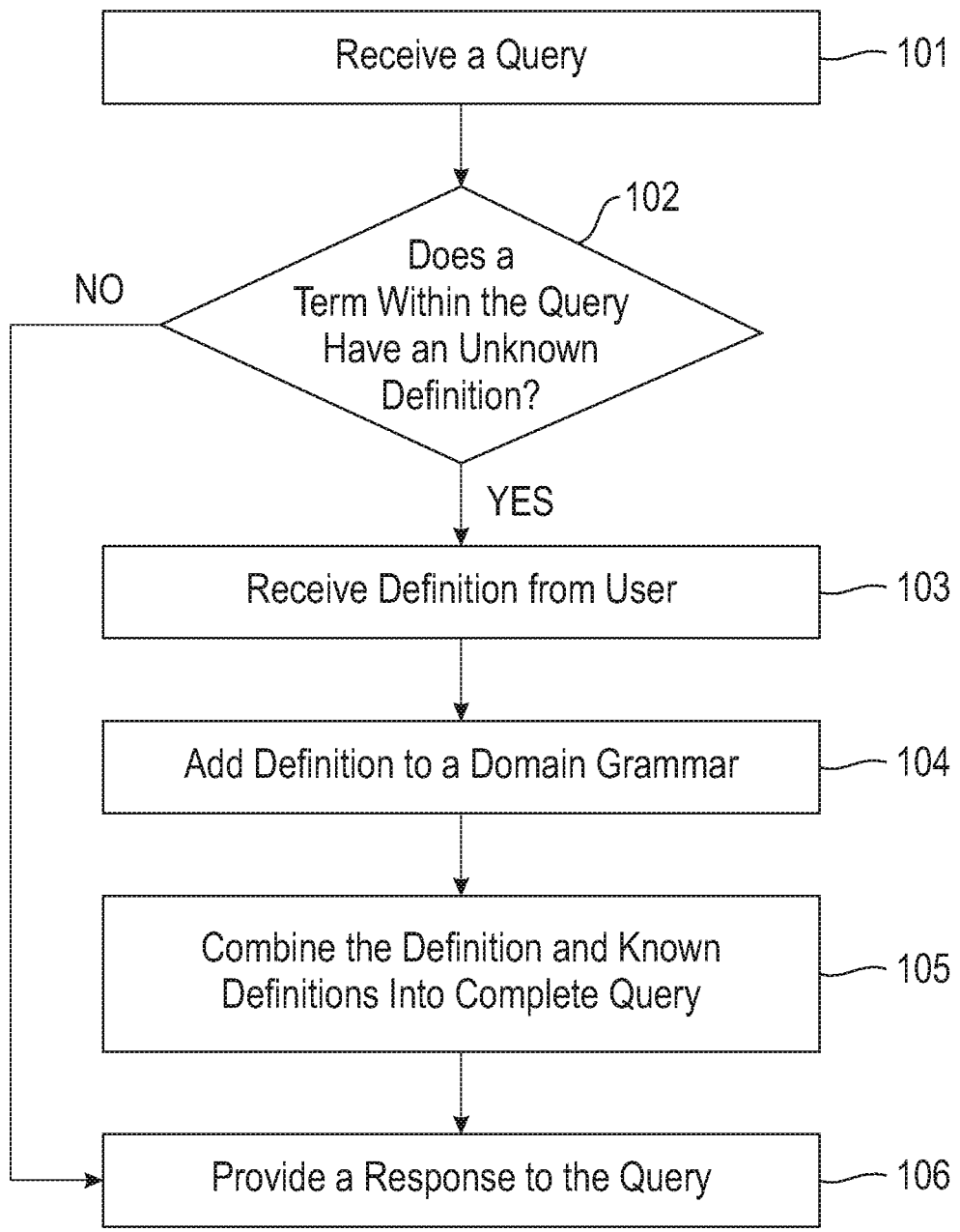
FIG. 1 illustrates a method of executing a query including terms whose definitions are unknown by utilizing definitions provided by a user, where the provided definitions are stored in a domain grammar for subsequent query use.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-3. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 3. In accordance with an example embodiment, most if not all of the process steps, components and outputs discussed with respect to FIGS. 1-2 can be performed or utilized by way of a processing unit or units and system memory such as those indicated, respectively, at 16' and 28' in FIG. 3, whether on a server computer, a client computer, a node computer in a distributed network, or any combination thereof.

Allowing provision of queries to obtain information from data repositories or knowledge stores is very useful and significantly reduces the amount of time that a user has to spend attempting to find information. Since many systems allow provision of the query in a natural language format, the user is able to provide a query in a manner that is natural for the user instead of needing to understand how the query system actually utilizes terms during execution of a query. By allowing the natural language queries, users increasingly provide queries that are more similar to how a query would be provided during a conversation with another person. Thus, the query systems have to become increasingly intelligent in order to understand terms that do not have a machine format equivalent without additional processing. For example, users may provide queries that include referring expressions, terms having definitions that are unknown to the system, domain-specific terms, terms having more than one definition, or the like.

Traditionally, to account for these terms that are not understood by the system, a programmer may employ a machine-learning model in conjunction with the query system. To train the machine-learning model to understand unknown terms, the model has to be trained utilizing training datasets. These datasets are usually very extensive and require a significant amount of time to create. Thus, one problem with this technique is the amount of time needed to create the training datasets so the system can learn terminology using the model. Additionally, if a term definition changes, for example, across domains, the model has to be retrained. This takes even more time in both training the model and creating the training datasets. Thus, this system does not allow for dynamically updating the system to learn new terms or update definitions for terms included in the model.

Another approach is for a user to manually program the system with definitions for terms. This takes a significant amount of time for a user to manually program each and every term that may be unknown to the system. Additionally, the user likely does not know every term that will be used in a query and, thus, is not able to fully program the system. Instead, when the system encounters an unknown term, the system may provide feedback to the user that the term is unknown, but is currently unable to provide a response to the query, which is not helpful to the person requesting information via the query. Additionally, the users that typically program the definitions for terms need to be well-versed in definitions for terms that may be found in a particular domain. In other words, the users providing definitions are generally subject-matter experts. Typically, subject-matter experts are in high demand for many different tasks and spending the extensive amount of time programming definitions is not the best use of time of these users. Thus, these conventional techniques are not very feasible. Additionally, these techniques do not allow for the dynamic updating of a query system. Rather, the system either has to be retrained or reprogrammed.

Accordingly, an embodiment provides a system and method for executing a query including terms whose definitions are unknown by utilizing definitions provided by a user, where the provided definitions are stored in a domain grammar for subsequent query use. The system receives a query from a user. The query may include a term that is related to a particular domain, for example, a financial domain, a legal domain, a programming domain, a retail domain, or the like. Upon receipt of the query, the system may parse the query and identify that a definition for the term is unknown by the system. In other words, the system may determine that the term does not map to a term having a known definition. The system may then request feedback from a user to identify the definition of the term. Thereafter, the system receives the definition of the term from the user.

Using the definition provided by the user, the system adds the definition to a domain grammar which includes terms and corresponding definitions. The domain grammar may include not only universal terms and definitions, but may also include domain-specific terminology. Thus, unique domain grammars may be created and stored for different domains. Accordingly, if similar terms having different definitions are utilized across domains, the system can keep these definitions segregated so that queries received in a particular domain are correctly responded to using the definition corresponding to that domain. To add the definition to the grammar, the system extracts expressions or terms from the provided definition and then adds the definition corresponding to the term to the domain grammar by placing the expressions into the structured format of the grammar.

In order to respond to the original query, the system then combines the recently received definition with definitions of terms that were previously known to create a complete query. The complete query is then utilized to execute a search on a data repository or knowledge store to identify, obtain, and provide a response to the query. Since the definition of the previously unknown term is stored in the domain grammar, upon receipt of subsequent queries that include that same term or a similar term, the system will not need feedback from a user and, instead, will be able to access the updated grammar to retrieve the definition for the term and use this definition to provide a response to the subsequent query.

Such a system provides a technical improvement over current systems for query response provision. The system is able to identify when terms having unknown definitions are included in a query. Upon identifying that a query includes a term with an unknown definition, the system requests that a user provide feedback identifying a definition of the term. Once the user provides the definition, the system can populate or update a domain grammar with the term and provided definition. Accordingly, the system can dynamically update the grammar which is not possible using conventional techniques that require either extensive training of a model or manual programming of the grammar. Thus, the described system and method significantly reduces the time and resource burden required to create and maintain a domain grammar as compared to conventional techniques. Additionally, since the system can dynamically update the domain grammar utilizing feedback from a user, the system does not need training datasets or gold standard data, which eliminates the time required to generate these training datasets or the gold standard data.

FIG. 1 illustrates a method for executing a query including terms whose definitions are unknown by utilizing definitions provided by a user, where the provided definitions are stored in a domain grammar for subsequent query use. At 101 the system receives a query from a user. Receipt of the query may be by way of traditional query techniques. For example, a user may provide a query into a search function or window of an application. As another example, the user may provide a query to a digital assistant or a chatbot application. The query may be provided using one or more input modalities, for example, voice input, text-based input, icon selection, or the like. The query may be a natural language query, or a query that is similar to how a person would ask another person a question or query.

The query may include one or more terms related to a particular domain or subject-matter area, for example, a retail domain, financial domain, legal domain, scientific domain, technology domain, or the like. Thus, the query may be directed toward a particular domain which indicates the type of response that is expected. Since different domains may utilize the same term but each domain utilizing a different definition for that term, identifying the domain assists in identifying the correct domain grammar so that the correct definition is utilized when responding to the query.

At 102 the system may determine if a term within the query has an unknown definition. For ease of readability, the discussion will focus on a single term having an unknown definition, but the query may include multiple terms having unknown definitions and the system will perform the same steps for all of the terms having unknown definitions. To determine if a term has an unknown definition, the system may first parse the query to identify different terms included in the query. If the query is provided in a natural language format, the system may use one or more natural language parsing techniques to extract the terms, for example, natural language processing, semantic analysis, parts-of-speech analyzer, annotators, information extractors, and the like. Similar parsing techniques may be used to extract terms even if the query is not received in a true natural language format. Parsing the query serves at least two purposes. First, the system is able to identify separate terms included in the query. Additionally, parsing the query is the first step to the system creating a machine-readable query. In other words, the system is unable to directly use the natural language query for executing a search and instead must convert it to a format that is readable by the system, referred to as a machine-readable format.

Once the query is parsed and terms are extracted, the system determines if any of the terms within the query maps to terms having a known definition. Terms may be included in a domain ontology or in a domain database. A domain ontology may be a knowledge repository that includes concepts and relationships there-between within a particular domain. A domain database may be a knowledge repository that includes terms and definitions or rules. Thus, the system may compare the terms of the query to the domain ontology or domain database to determine if the term is included in the domain ontology or the domain database. The system may also access other secondary sources, for example, the Internet, ontologies for similar domains, entity databases, or the like. Additionally, in determining if a term has a known definition, the system may also access a domain grammar.

A domain grammar is unique to the described system and includes terms and definitions of the terms. While a domain generally applies to an overall subject-matter area, a domain grammar may also be more finely tuned for a more specific domain. For example, within the retail domain different systems or applications may use different terminology or may include different definitions for the same term. Thus, while a domain grammar may be utilized across an entire domain, a domain grammar may also be individualized for different environments or entities within a particular domain.

The terms and definitions within the domain grammar are included in a structured format. The structured format identifies different portions of the definition and provides fields for the portions of the definition. Example fields include a return field that identifies a value type for a response to the term, a rule field for computing the return, a filter field, condition field for the term, and the like. Having the structured format ensures that each term and corresponding definition is formatted similarly throughout the domain grammar. Utilizing a structured format within the domain grammar allows for using the grammar with many different downstream applications, for example, machine-learning models, follow-up or subsequent queries, query recommendation applications, domain systems or applications, or the like. In other words, by putting the terms and definitions in a structured format, downstream applications can be programmed to identify the particular format. The application is then able to access and utilize any of the terms or definitions included in the grammar since all of the terms and definitions in the grammar will be structured similarly. Thus, the downstream applications do not have to be programmed with each individual term and definition.

If the term does not have an unknown definition, the system may utilize the known definition in providing a response to the query at 106. In other words, if the term and a corresponding definition are included in one of the definition sources, the system may utilize this known definition in providing a response to the query at 106. If the term has an unknown definition, the system may first determine if the term is a non-modeled term before requesting feedback from a user. A non-modeled term is a term that is not and should not be included in the domain grammar. Such terms include those terms that should not be queried within the domain grammar. For example, if the domain is a retail inventory domain, a non-modeled term may be "customer income." The income of a customer has no bearing on the retail inventory, so it is a non-modeled term. Thus, a non-modeled term may be a term that will not be included in the grammar domain because queries regarding the term should be rejected. In the case that a term is a non-modeled term, the system may provide feedback to the user indicating that such a term is an inappropriate term for a query within the particular domain.

If the term has an unknown definition and, in the case that it is determined that it is not a non-modeled term, the system may receive a definition from a user at 103. In other words, if the term does not have a definition within one of the term/definition sources, the system may receive a definition from the user at 103. Receipt of the definition from the user may be responsive to the system requesting feedback from the user, for example, requesting a definition from the user, indicating that a definition for a term is unknown, or the like. Once the definition is provided, the system may parse the definition and extract information from the definition, for example, other terms, information identified in the grammar format, and the like.

In providing the definition, the user may include terms that are unknown to the system, or terms having unknown definitions. Upon receiving or identifying the unknown term within the definition, the system may request additional information from the user with respect to these new unknown terms. In other words, once the system receives the definition from the user, the system performs similar steps as discussed in connection with steps 101 and 102. If the definition includes terms having unknown definitions, the system receives feedback from the user to provide definitions for these terms.

Alternatively, the system may receive confirmation of a definition from the user. For example, while the system may identify that the provided term does not have a definition, the system may identify a term that appears to be similar to the provided term. Determining a similarity may include utilizing one or more similarity techniques, for example, similarity measures, cosine similarity, clustering techniques, affinity measurements, class distribution measures, and the like. If this similar term has a definition, the system may request the user confirm that the definition is an accurate definition for the provided term. For example, the system may provide the similar term and request the user confirm whether the term has the same meaning as the provided term. As another example, the system may provide the definition of the similar term, without identifying the similar term, and request the user confirm that the definition is accurate. The system may also identify a portion of the definition from one of the term/definition sources. For example, if the provided term has more than one term, the system may identify a definition for one of the terms and then request a definition for the remaining terms. As another example, if the system finds more than one possible definition for the term, the system may request clarification or confirmation from the user regarding which definition should be utilized.

Once the system has received a definition for a term having a previously unknown definition, the system adds the definition to the domain grammar. In the case that the definition included unknown terms, the definitions for these unknown terms are also added to the domain grammar. In other words, all terms whose definition was received or updated is added to or updated within the domain grammar. While the domain grammar includes domain-specific terminology, it may also include domain independent terminology, or terminology that is not based on the domain of the grammar. The domain grammar also includes the definitions corresponding to the terms within the grammar. Thus, once the system receives the definition for the term having the previously unknown definition, the system can add the term and corresponding definition to the domain grammar. When adding the definition, the system adds the definition in the structured format of the domain grammar. Thus, to add the definition, the system parses the definition and extracts terms or expressions from the definition. These extracted terms or expressions are then added to the domain grammar in the proper field within the structured format.

While at least some of the terms included in the domain grammar may be domain dependent, the methodology for generating and updating the domain grammar is domain independent. In other words, creating and/or updating the domain grammar occurs in a similar manner regardless of the domain. Additionally, the structured format of the domain grammar is domain independent. This allows for many different types of downstream applications to utilize the domain grammar without having to be specifically programmed for a particular domain. Since the structured format of the domain grammar is domain independent, the format may include fields that are not applicable to all domains. In the event that a term and corresponding definition are added to the domain grammar that does not have input for every field, the unfilled fields may be marked so that an error is not encountered when accessing the definition. For example, the unfilled fields may be marked as "N/A", "empty", left blank, or however programmed by the developer.

At 105 the system combines the definition of the previously unknown term and the definitions of the terms that were known into a complete query. In other words, the system utilizes the now-known definitions of all the terms in the query to create a complete query that can be utilized to execute a search for a response. Thus, combining the query may include transforming the complete query into a machine-readable format that can be executed by the system. Once the query is combined into the complete query, the system can utilize this complete query to execute the query on a knowledge store or data repository. The information returned as a result of this query is provided as a response to the query to the user at 106. Additionally, if the query that was received at 101 did not have any unknown definitions, then the system executes the query and provides a response to the query at 106. In other words, once the system understands all terms within the query, the system executes the query as in traditional query systems.

Since the domain grammar is dynamically updated every time a term having an unknown definition is encountered, upon receiving subsequent queries having that term, the system does not have to request user feedback. Instead, when the system determines whether the term has a definition by accessing the domain grammar, the system would be able to access that definition. Thus, the described system is able to understand complex domain specific terminology using feedback from a user that only has to be provided once and that can be then used for subsequent queries.

Figure 2:
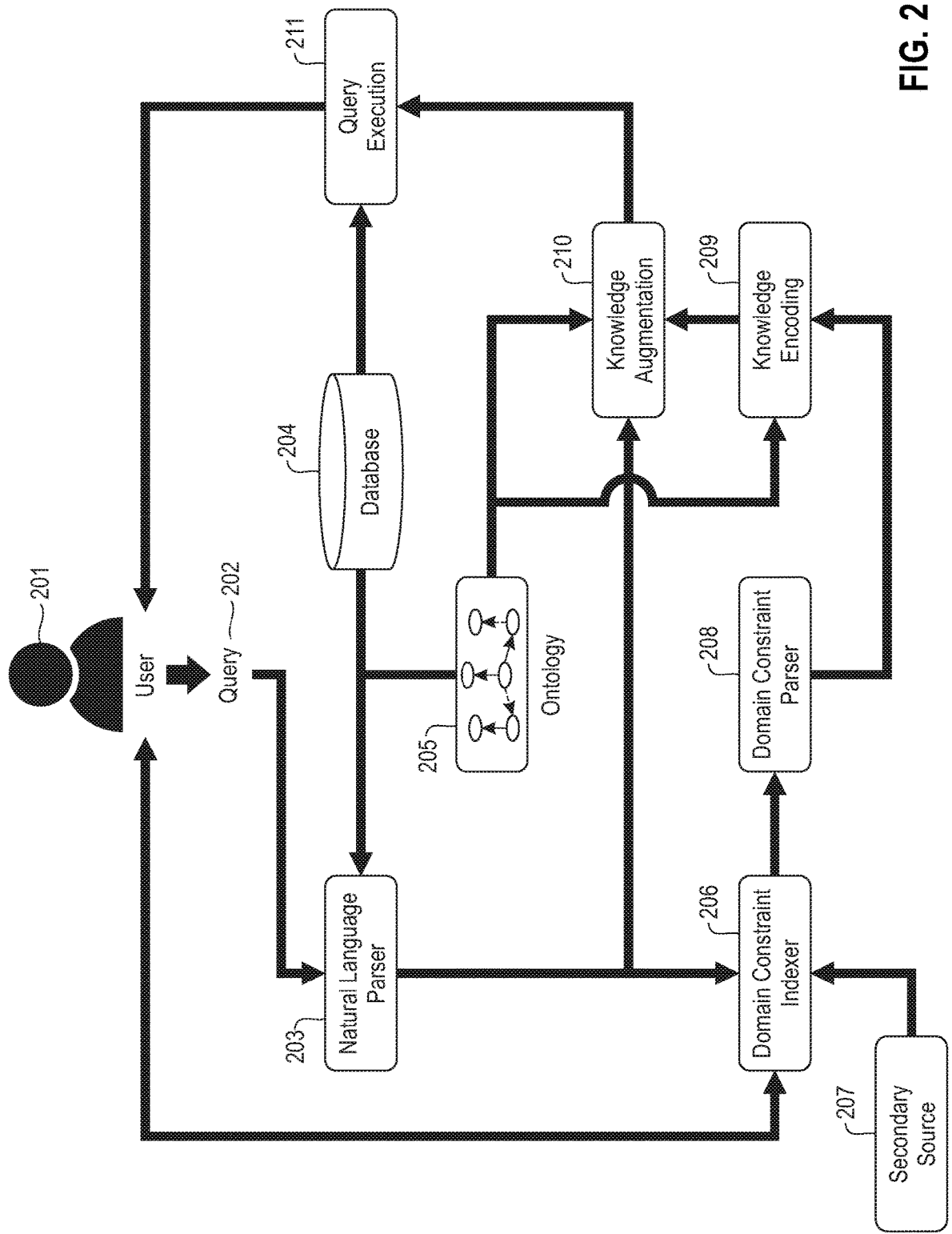
FIG. 2 illustrates an example system architecture for executing a query including terms whose definitions are unknown by utilizing definitions provided by a user, where the provided definitions are stored in a domain grammar for subsequent query use.

FIG. 2 illustrates an overall system architecture of the described methodology. The user 201 provides a query 202 to the system. The natural language parser 203 parses that query to identify and extract terms within the query 202. To understand the terms, the natural language parser 203 utilizes a database 204 and/or a domain ontology 205. If the query 202 includes terms having unknown definitions, those terms are provided to a domain constraint indexer 206 which is included as part of the domain grammar. The domain constraint indexer 206 determines if the term is included in the domain grammar and can access secondary sources 207 to assist in determining a definition of the term. If a definition cannot be identified, the system requests feedback from the user 201. The system may also request confirmation or clarification from the user 201 in the case that a partial definition or similar term/definition is found.

The definition from the user 201 is provided to the domain constraint indexer 206. The definition is also provided to the domain constraint parser 208 which updates the domain grammar with the term and now-known definition. To perform this update, the domain constraint parser 208 parses the definition and extracts terms or expressions to be populated within the fields of the domain grammar. Parsing the definition can be performed using one of a plurality of parsing techniques, for example, semantic parsing, annotator, information extractors, Lambda-dependency based compositional semantics parsing, or the like. Once the definition is parsed, the parsed terms are provided to the knowledge encoding component 209 to be placed into the domain grammar within the proper term and definition. The knowledge encoding component 209 ensures that all of the terms and definitions of the domain grammar are included in the same structured format.

Now that the definition for the previously unknown term is known, that definition along with the definitions for terms that were known are passed to the knowledge augmentation component 210. The knowledge augmentation component 210 combines the now-known and previously known term definitions into a single complete query. In other words, the knowledge augmentation component 210 combines the definition received as feedback from the user with the definitions that were successfully interpreted by the natural language parser 203 into a full final query. The full final query is then sent to the query execution component 211 which executes the query, for example, on database 204 or another data repository. The result of this execution is then provided back to the user 201 as a response to the original query.

Thus, the described systems and methods represent a technical improvement over current systems for query response provision. Instead of using a machine-learning model to learn definitions for new terms, the described system and method can utilize one-time feedback from a user providing the query. The system can then update a domain grammar with the definition feedback so that the definition can be used for subsequent queries that include the term. Thus, the described system allows for dynamically updating the domain grammar without needing significant retraining of a machine-learning model to learn or relearn a definition of a term, as in conventional systems. Additionally, time does not have to be spent creating either a gold standard or training datasets in order to train models as in the conventional system. Additionally, since the described system is able to update the grammar based upon feedback from a user, a different user (e.g., a subject-matter expert, etc.) does not have to spend time programming terms and definitions into the grammar. Thus, the described system greatly reduces the amount of time that is required to program or populate the domain grammar. Additionally, the resulting domain grammar includes accurate definitions for terms that can be used upon receipt of subsequent queries having the previously unknown terms, thereby allowing for a system that can be utilized for repeated queries instead of just the current query.

Figure 3:
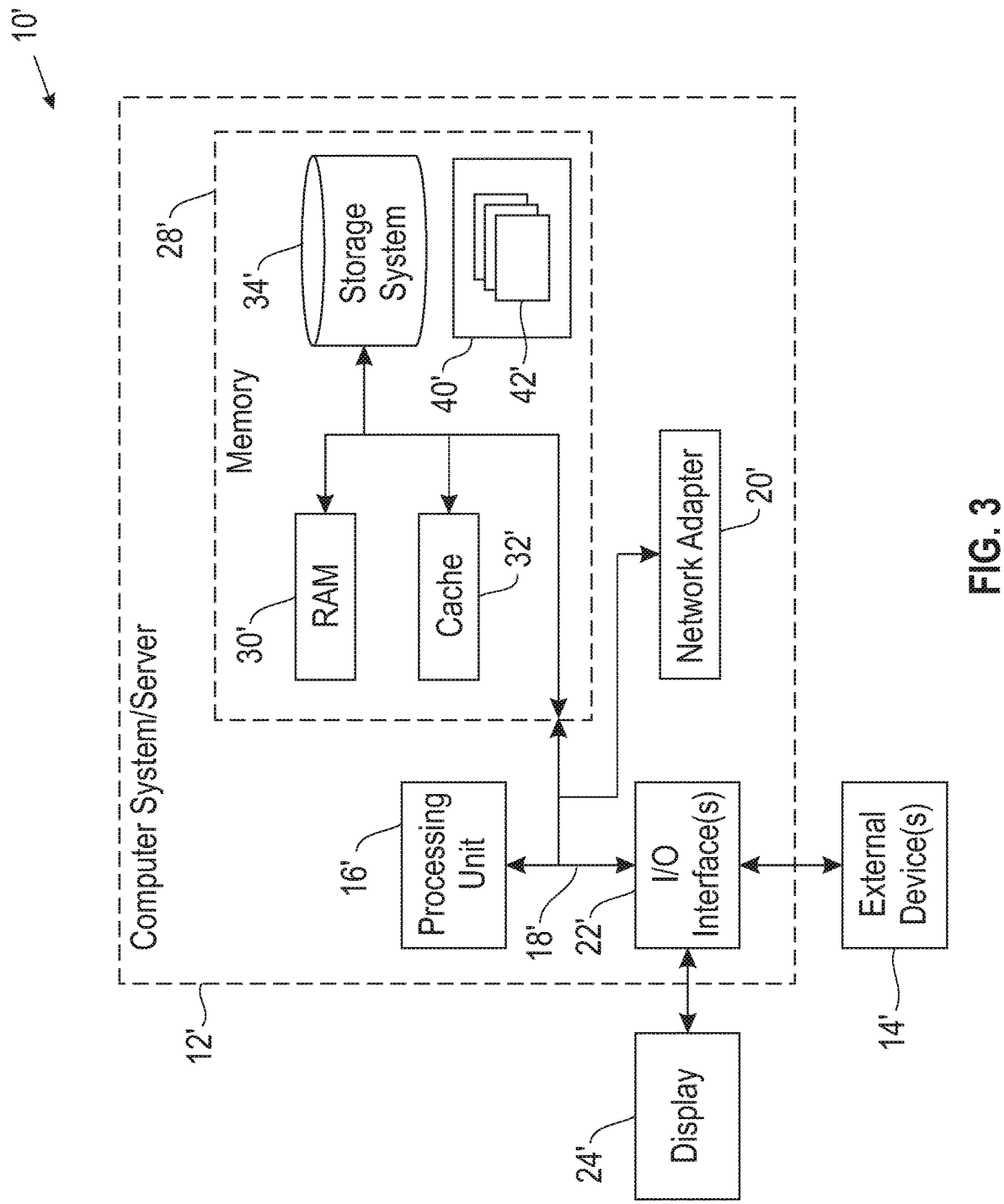
FIG. 3 illustrates a computer system.

As shown in FIG. 3, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
    receiving a query from a user, wherein the query comprises a plurality of terms, wherein at least one term of the plurality of terms is related to a particular domain;
    identifying that a desired definition of the at least one term is unknown, by determining that the at least one term does not map to a term having a known definition, wherein the identifying comprises identifying the plurality of terms by parsing the query and mapping the plurality of terms to both a domain ontology corresponding to the domain and a domain grammar corresponding to the domain, wherein the domain grammar comprises terms and definitions of terms in a structured format, wherein the structured format is domain independent;
    receiving, responsive to determining the at least one term is not a non-modeled term and requesting feedback from a user, a requested definition of the at least one term from the user, wherein the non-modeled term comprises a term that is not included in the domain grammar;
    adding, responsive to receiving the requested definition and for the at least one term, the requested definition to the domain grammar comprising (i) domain-specific terminology and (ii) various definitions corresponding to the terms within the domain grammar, wherein the adding further comprises (iii) extracting expressions from the requested definition and (iv) adding, for the at least one term, the expressions into a field of the structured format corresponding to the expression within the domain grammar;
    combining (v) the requested definition and (vi) terms from the parsed query having previously known definitions into a complete query; and
    providing, responsive to receiving the requested definition, adding the requested definition to the domain grammar, and combining the complete query, a response to the complete query by executing the complete query on a knowledge store.

2. The method of claim 1, wherein the identifying comprises (i) comparing terms within the query to the domain grammar and (ii) determining that the at least one term is not included in the domain grammar.

3. The method of claim 2, wherein the identifying further comprises searching at least one of: a secondary source and a domain ontology, to identify at least a portion of the definition to the at least one term.

4. The method of claim 3, comprising confirming the at least a portion of the definition with a user.

5. The method of claim 1, wherein, upon receiving a subsequent query including the at least one term, the at least one term is treated as a term whose definition is known.

6. The method of claim 1, wherein, upon receiving the feedback, the system identifies a second term within the feedback having an unknown definition; and
    requesting secondary feedback from the user requesting the unknown definition for the second term.

7. The method of claim 6, wherein the adding comprises adding the unknown definition for the second term to the domain grammar.

8. The computer program product of claim 6, wherein the adding comprises adding the unknown definition for the second term to the domain grammar.

9. The method of claim 1, comprising identifying a known term having a similarity to the at least one term; and
    accessing the definition for the known term from the domain grammar.

10. The method of claim 9, comprising requesting confirmation from the user that the definition of the known term is acceptable for use as the definition for the at least one term.

11. The method of claim 1, comprising, responsive to determining that the at least one term comprises a non-modeled term and should not be included in the domain grammar, providing feedback to a user that the at least one term comprises a term that is an inappropriate term for a query within the particular domain.

12. An apparatus, comprising:
at least one processor; and
a computer readable storage medium having computer readable program code embodied therewith and executable by the at least one processor, the computer readable program code comprising:
computer readable program code configured to receive a query from a user, wherein the query comprises a plurality of terms, wherein at least one term of the plurality of terms is related to a particular domain;
computer readable program code configured to identify that a desired definition of the at least one term is unknown, by determining that the at least one term does not map to a term having a known definition, wherein the identifying comprises identifying the plurality of terms by parsing the query and mapping the plurality of terms to both a domain ontology corresponding to the domain and a domain grammar corresponding to the domain, wherein the domain grammar comprises terms and definitions of terms in a structured format, wherein the structured format is domain independent;
computer readable program code configured to receive, responsive to determining the at least one term is not a non-modeled term and requesting feedback from a user, a requested definition of the at least one term from the user, wherein the non-modeled term comprises a term that is not included in the domain grammar;
computer readable program code configured to add, responsive to receiving the requested definition and for the at least one term, the requested definition to the domain grammar comprising (i) domain-specific terminology and (ii) various definitions corresponding to the terms within the domain grammar, wherein the adding further comprises (iii) extracting expressions from the requested definition and (iv) adding, for the at least one term, the expressions into a field of the structured format corresponding to the expression within the domain grammar;
computer readable program code configured to combine (v) the requested definition and (vi) terms from the parsed query having previously known definitions into a complete query; and
computer readable program code configured to provide, responsive to receiving the requested definition, adding the requested definition to the domain grammar, and combining the complete query, a response to the complete query by executing the complete query on a knowledge store.

13. A computer program product, comprising:
a computer readable storage medium having computer readable program code embodied therewith, the computer readable program code executable by a processor and comprising:
computer readable program code configured to receive a query from a user, wherein the query comprises a plurality of terms, wherein at least one term of the plurality of terms is related to a particular domain;
computer readable program code configured to identify that a desired definition of the at least one term is unknown, by determining that the at least one term does not map to a term having a known definition, wherein the identifying comprises identifying the plurality of terms by parsing the query and mapping the plurality of terms to both a domain ontology corresponding to the domain and a domain grammar corresponding to the domain, wherein the domain grammar comprises terms and definitions of terms in a structured format, wherein the structured format is domain independent;
computer readable program code configured to receive, responsive to determining the at least one term is not a non-modeled term and requesting feedback from a user, a requested definition of the at least one term from the user, wherein the non-modeled term comprises a term that is not included in the domain grammar;
computer readable program code configured to add, responsive to receiving the requested definition and for the at least one term, the requested definition to the domain grammar comprising (i) domain-specific terminology and (ii) various definitions corresponding to the terms within the domain grammar, wherein the adding further comprises (iii) extracting expressions from the requested definition and (iv) adding, for the at least one term, the expressions into a field of the structured format corresponding to the expression within the domain grammar;
computer readable program code configured to combine (v) the requested definition and (vi) terms from the parsed query having previously known definitions into a complete query; and
computer readable program code configured to provide, responsive to receiving the requested definition, adding the requested definition to the domain grammar, and combining the complete query, a response to the complete query by executing the complete query on a knowledge store.

14. The computer program product of claim 13, wherein the identifying comprises (i) comparing terms within the query to the domain grammar and (ii) determining that the at least one term is not included in the domain grammar.

15. The computer program product of claim 14, wherein the identifying further comprises searching at least one of: a secondary source and a domain ontology, to identify at least a portion of the definition to the at least one term.

16. The computer program product of claim 15, comprising confirming the at least a portion of the definition with a user.

17. The computer program product of claim 13, wherein, upon receiving a subsequent query including the at least one term, the at least one term is treated as a term whose definition is known.

18. The computer program product of claim 13, wherein, upon receiving the feedback, the system identifies a second term within the feedback having an unknown definition; and
requesting secondary feedback from the user requesting the unknown definition for the second term.

19. The computer program product of claim 13, comprising identifying a known term having a similarity to the at least one term; and
accessing the definition for the known term from the domain grammar.

20. A method, comprising:
receiving a query from a user;
parsing the query into a plurality of terms;
identifying known terms of the plurality of terms within the query having known definitions, wherein the identifying comprises mapping the known terms to both a domain ontology corresponding to a particular subject-matter area and a subject-matter area grammar corresponding to the particular subject-matter area, wherein the subject-matter area grammar comprises terms and definitions of terms in a structured format, wherein the structured format is subject-matter area independent;

identifying an unknown term within the query having an unknown definition and being related to the particular subject-matter area, wherein the identifying comprises comparing the unknown term to the subject-matter area grammar and determining the unknown term is not included in the subject-matter area grammar;

requesting, responsive to determining the unknown term is not a non-modeled term and from a user, a definition for the unknown term, wherein the non-modeled term comprises a term that is not included in the domain grammar;

for the unknown term and upon receipt of the definition from the user, parsing the definition into expressions, extracting the expressions, and adding, for the unknown term, the extracted expressions to the subject-matter area grammar comprising (i) subject-matter area specific terminology and (ii) various definitions corresponding to the terms within the subject-matter area grammar, wherein the adding comprises adding the expressions into a field of the structured format corresponding to the expression;

creating a complete query from (iii) the definition of the unknown term and (iv) the known definitions of the terms; and providing, responsive to receiving the requested definition, parsing the definition, and creating the complete query, a response to the complete query by utilizing the complete query to perform a search for the response on a knowledge store.

\* \* \* \* \*